United States Patent
Lee et al.

(10) Patent No.: US 8,654,702 B2
(45) Date of Patent: Feb. 18, 2014

(54) METHOD AND APPARATUS FOR THE CONTROLLING SCHEDULING IN A RADIO COMMUNICATION SYSTEM

(75) Inventors: Seung-Hyun Lee, Seoul (KR); Hyung-Joon Jeon, Seongnam (KR); Kuk-Jin Song, Yongin (KR)

(73) Assignee: Intellectual Discovery Co., Ltd., Seoul (KR)

( * ) Notice: Subject to any disclaimer, the term of this patent is extended or adjusted under 35 U.S.C. 154(b) by 156 days.

(21) Appl. No.: 13/142,769

(22) PCT Filed: Dec. 28, 2009

(86) PCT No.: PCT/KR2009/007818
§ 371 (c)(1),
(2), (4) Date: Jun. 29, 2011

(87) PCT Pub. No.: WO2010/077031
PCT Pub. Date: Jul. 8, 2010

(65) Prior Publication Data
US 2011/0274068 A1 Nov. 10, 2011

(30) Foreign Application Priority Data
Dec. 31, 2008 (KR) .................. 10-2008-0138805
Mar. 6, 2009 (KR) .................. 10-2009-0019398

(51) Int. Cl.
*H04W 4/00* (2009.01)
(52) U.S. Cl.
USPC ................... 370/322; 370/329; 370/341
(58) Field of Classification Search
USPC .............. 370/236.1, 321, 322, 328, 329, 341, 370/395; 455/69
See application file for complete search history.

(56) References Cited

U.S. PATENT DOCUMENTS

| | | | | |
|---|---|---|---|---|
| 7,630,338 | B2* | 12/2009 | Vesterinen et al. | 370/329 |
| 8,238,958 | B2* | 8/2012 | Bourlas et al. | 455/522 |
| 2007/0099648 | A1 | 5/2007 | Kim et al. | |
| 2007/0121547 | A1* | 5/2007 | Huh et al. | 370/329 |
| 2007/0155337 | A1* | 7/2007 | Park et al. | 455/69 |
| 2010/0208687 | A1* | 8/2010 | Lim et al. | 370/329 |

FOREIGN PATENT DOCUMENTS

KR   1020050044219 A   5/2005

OTHER PUBLICATIONS

International Search Report for PCT/KR2009/007818 filed on Dec. 28, 2009.
Written Opinion for PCT/KR2009/007818 filed on Dec. 28, 2009.

* cited by examiner

*Primary Examiner* — Jeffrey M Rutkowski
*Assistant Examiner* — Harun Chowdhury
(74) *Attorney, Agent, or Firm* — Sughrue Mion, PLLC

(57) ABSTRACT

The present invention relates to a method and to an apparatus for controlling the scheduling in a radio communication system, which comprise calculating a first resource value for a first data packet using packet information of the first data packet, determining an MCS level and a transmission power density for the first data packet and a second data packet using a resource allocation parameter for the first data packet and packet information of the second data packet, calculating a second resource value for the first data packet and the second data packet using the MCS level and the transmission power density determined in the previous step, and allocating the second resource value for the first data packet and the second data packet as an uplink resource if the second resource value is not greater than the total number of allocable resources of an uplink frame.

20 Claims, 4 Drawing Sheets

METHOD AND APPARATUS FOR THE CONTROLLING SCHEDULING IN A RADIO COMMUNICATION SYSTEM

TECHNICAL FIELD

The present invention relates generally to a method and apparatus for controlling a scheduling in a radio communication system, and more particularly to a method and apparatus for controlling a scheduling uplink which determine an MCS (Modulation and Coding Scheme) level and a transmission power level by using resource allocation information of uplink (hereinafter, referred to as 'UL') data packet in UL scheduling.

BACKGROUND ART

Research on the next-generation communication system is being conducted to provide users with various QoS (Quality of Service) services at a high data rate.

In radio communication system, a base station (hereinafter, referred to as 'BS') performs an UL scheduling in accordance with transmission data packet and channel environment of a mobile station (hereinafter, referred to as 'MS') in cell.

Generally, the BS performs a packet scheduling for the UL data packet that the MS will transmits, according to the priority order, and allocates UL resources to the MS based on UL data packet information and transmission power report information. In this case, when the BS allocates UL resources to the MS, the BS perform a scheduling control to determine a proper MCS level and transmission power density for the UL data packet.

According to a conventional scheduling control method, the BS determines the MCS level and the transmission power density for the first UL data packet (i.e. UL data packet having the highest priority order) among UL data packets that are scheduled for the MS, and allocates UL resource by applying the determined MCS level and the transmission power density for the UL data packet.

However, in case that the BS allocates resource for remained UL data packet by applying the MCS level and the transmission power density corresponding to the first UL data packet, there is a problem that the BS can not select more proper MCS level corresponding to the remained UL data packet.

Therefore, there is a demand for new scheduling control scheme that can determine more proper MCS level and transmission power density to efficiently allocate UL resources to UL data packets when the BS performs the UL scheduling in a radio communication system. Also, there is a demand for a method and apparatus that can determine more proper MCS level and transmission power density in accordance with types of bursts when the BS allocates multi-bursts to the MS.

DISCLOSURE

Technical Problem

Therefore, the present invention has been made in view of the above-mentioned demands, and it is an object of the present invention to provide a method and apparatus for scheduling control which determine a proper MCS level and transmission power density to efficiently allocates resources for the UL data packets of the MS when the BS performs the UL scheduling in a radio communication system.

It is another object of the present invention to provide a method and apparatus for scheduling control which determine an MCS level and transmission power density corresponding to the type of the connection for the UL data packet when the BS allocates multi-bursts to the MS in a radio communication system.

Technical Solution

According to one aspect of the present invention, there is provided a method for controlling an uplink scheduling in a radio communication system, the method comprising: calculating a first resource value for a first data packet by using packet information of the first data packet; determining an MCS level and a transmission power density for the first data packet and a second data packet by using a resource allocation parameter for the first data packet and packet information of the second data packet; calculating a second resource value for the first data packet and the second data packet by using the MCS level and the transmission power density; and allocating the second resource value for the first data packet and the second data packet as an uplink resource if the second resource value is not greater than the number of total allocable resources of an uplink frame.

According to another aspect of the present invention, there is provided an apparatus for controlling an uplink scheduling in a radio communication system, the apparatus comprising: a packet scheduler for performing a packet scheduling for at least one uplink data packet corresponding to a bandwidth request from a terminal in accordance with a resource allocation order; an operation part for calculating a second resource value for a first data packet and a second data packet by using a resource allocation parameter of the first data packet and packet information of the second data packet, and determining an uplink resource for the first data packet and the second data packet in accordance with the second resource value if the second resource value is not greater than the number of total allocable resources of an uplink frame; and a generation part for generating MAP information containing information about an uplink burst allocation and information about an MCS level and a transmission power density, based on the information about the uplink resource.

According to further another aspect of the present invention, there is provided a base station that allocates an uplink burst to a terminal in a radio communication system, wherein the base station performs a packet scheduling for at least one uplink data packet in accordance with a resource allocation order, calculates a first resource value for a first data packet, calculates a second resource value for the first data packet and a second data packet by using a resource allocation parameter for the first data packet and packet information about the second data packet, allocates the first resource value for the first data packet as an uplink resource if the second resource value is greater than the number of total allocable resources of an uplink frame, and allocates the second resource value for the first data packet and the second data packet as the uplink resource if the second resource value is not greater than the number of total allocable resources of the uplink frame.

Advantageous Effects

The present invention can increase the data transmission rate of the MS by determining more proper MCS level and transmission power density for the UL data packet since the BS determines the MCS level and transmission power level for the UL data packet in accordance with the number of total bytes of UL data packet of the MS when the BS performs the UL scheduling in a radio communication system.

Also, the present invention can determine more efficient MCS level and transmission power density by determining the MCS level and transmission power density corresponding to the type of the connection for the UL data packet when the BS allocates multi-bursts to the MS in a radio communication system.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
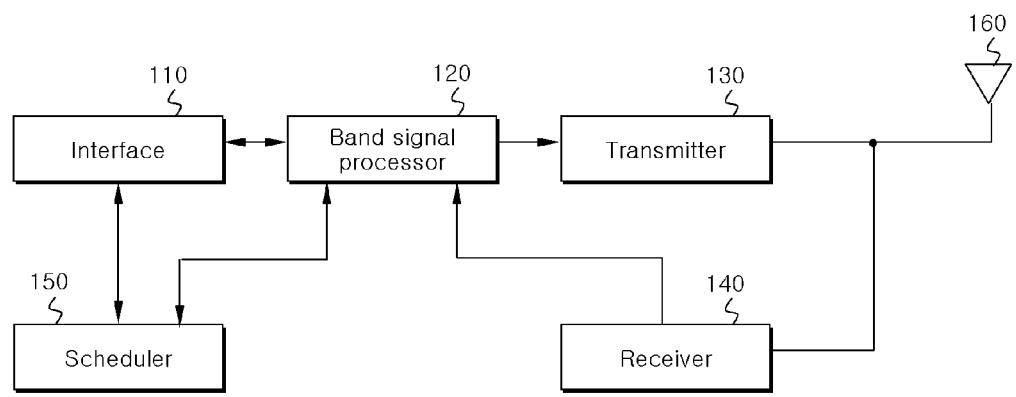
FIG. 1 is a diagram illustrating a structure of a BS in a radio communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

FIG. 1 is a diagram illustrating a structure of a BS in a radio communication system according to an embodiment of the present invention.

For reference, regarding FIG. 1, the BS according to the present invention can multi-bursts to the MS in UL burst allocation. Herein, the multi-bursts include a burst (hereinafter, referred to as 'HARQ burst') that transmits data packet through the HARQ supportable connection and a burst (hereinafter, referred to as 'normal burst') that transmits data packet through the HARQ non-supportable connection.

Referring to FIG. 1, the BS according to the present invention includes an interface 110 which processes data in transmission/reception of data, a band signal processor 120 which performs modulation/demodulation and encoding/decoding for data, a transmitter 130 which transmits the modulated and encoded data to the MS, a receiver 140 which receives data from the MS, a scheduler 150 which performs the scheduling for data transmission/reception in downlink (hereinafter, referred to as 'DL') and UL, and an antenna 160 which transmits and receives data with the MS through the air.

In UL path, the receiver 140 receives one or more radio signals that the MSs transmit, via the antenna 160, and converts the received radio signals into baseband signals. For example, the receiver 140 removes noises from the received signals, amplifies the noise-removed signals, down-converts the amplified signals into baseband signals, and digitalizes the down-converted baseband signals. The band signal processor 120 extracts information or data bits from the digitalized signals, and performs demodulation, decoding, error correction processes thereon. The information or data bits which go through these processes are sent to adjacent wired/wireless networks via the interface 110 or transmitted again to other MSs being served by the BS through transmission path.

In this case, the receiver 140 according to an embodiment of the present invention receives a bandwidth request (hereinafter, referred to as 'BW-REQ') message and transmission power report message from the MS and sends them to the scheduler 150.

In DL path, the interface 110 receives voice, data and/or control information from a base station controller or radio network, and the band signal processor 120 encodes the voice, data and/or control information and outputs the results to the transmitter 130. The transmitter 130 modulates the encoded voice, data and/or control information with carrier signals having a desired transmission frequency or frequencies, amplifies the modulated carrier signals to a level suitable for transmission, and transmits the amplified carrier signals over the air via the antenna 160.

Meanwhile, the scheduler 150 controls each process and element in DL and UL. In this case, the scheduler 150 determines the MCS level and the transmission power density for the MS by using the MS information and channel information in DL and UL, and allocates UL resources.

In particular, the scheduler 150 according to the present invention performs the packet scheduling for the UL data packet of the MS based on the bandwidth allocation request from the MS, and allocates UL bursts for the scheduled UL data packet according to resource allocation order. In this case, the scheduler 150 efficiently performs the scheduling control for the UL bursts according to resource allocation order, by using a resource value (hereinafter, referred to as 'first resource value') for the first data packet and a resource value resource (hereinafter, referred to as 'second resource value') for the first data packet and the second data packet.

Herein, the second data packet is defined as a data packet to which the scheduler 150 allocates the resource next to the first data packet according to resource allocation order. The first resource value is calculated based on the MCS level and the transmission power density for the first data packet which are determined by using the packet information of the first data packet. The second resource value is calculated based on the MCS level and the transmission power density for the first data packet and the second data packet which are determined by using the resource allocation parameter of the first data packet and the packet information of the second data packet.

Hereinafter, with reference to FIG. 2, an apparatus for UL scheduling in wireless communication system according to an embodiment of the present invention will now be described.

Figure 2:
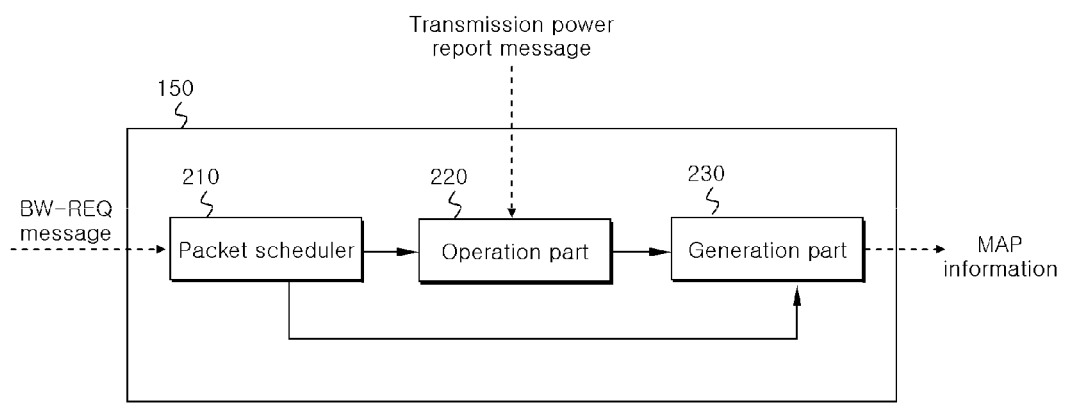
FIG. 2 is a diagram illustrating a structure of a scheduler according to an embodiment of the present invention.

FIG. 2 is a diagram illustrating the structure of the scheduler 150 of FIG. 1.

Referring to FIG. 2, the scheduler 150 according to the present invention includes a packet scheduler 210 that performs the packet scheduling for the UL data packet of the MS, an operation part 220 that determines the MCS level and transmission power density for the MS, and a generation part 230 that generates the MAP information containing information about the UL burst that is allocated based on the resource allocation information of the MS.

The packet scheduler 210 receives the BW-REQ message of the MS through the receiver 140, checks UL data packet information included in the BW-REQ message, and performs the packet scheduling for the UL data packet of the MS. In this case, the UL data packet information includes a packet size of the UL data packet, service type, connection type, etc. Then, the packet scheduler 210 performs the packet scheduling that determines the resource allocation order for the UL data packet in accordance with the UL data packet information.

Specifically, the packet scheduler 210 stores information about at least one UL data packet for which the bandwidth allocation is requested, according to the reception order of the bandwidth allocation request from the MS, checks the stored information about each UL data packet, and performs the packet scheduling according to the priority order of the UL data packet which is determined based on the service type and the connection type, etc.

The packet scheduler 210 transmits packet information of the UL data packet to the operation part 220, in order of the resource allocation. Herein, the packet information includes the burst type (e.g. normal burst, first HARQ sub-burst, second HARQ sub-burst), connection type, and data size.

The operation part 220 redetermines the MCS level and the transmission power density which are required to calculate the resource value for current allocation (e.g. the second resource value), by using the packet information of the current UL data packet (e.g. the second data packet), the resource allocation parameters for the previous UL data packet (e.g. the first data packet) for which the resource value has been already calculated based on the previous determined MCS level and transmission power density, and the total remained power of the MS. In this case, the resource allocation parameters for the first data packet denote parameters for the resource allocation that can be acquired based on the first resource value. For reference, the total remained power of the MS denotes the total remained power (hereinafter, referred to as 'the first total remained power') before the calculation of the first resource value, which can be checked by the total remained power included in the transmission power report message from the MS. Also, the second resource value denotes the resource value that is the sum of the recalculated first resource value for the first data packet corresponding to the redetermined MCS level and transmission power density and the resource value for the second data packet.

The operation part 220 receives the packet information of the second data packet from the packet scheduler 210, checks the packet size of the second data packet (hereinafter, referred to as 'the number of the second total allocation bytes') and the connection type, and checks the MCS level and the transmission power density that are determined for the first data packet based on the resource allocation parameters for the first data packet, the number of total allocation bytes, the number of total allocation slots (i.e. the number of slots that are allocated in accordance with the first resource value), the number of total allocation slots of UL frame, and current total remained power (hereinafter, referred to as 'second total remained power') that is a result of subtracting total consumption power corresponding to the first resource value from the first total remained power.

Specifically, the operation part 220 determines the MCS level and the transmission power density for the first data packet based on the packet information of the first data packet, and calculates the first resource value for the first data packet by applying the determined MCS level and transmission power density. Then, the operation part 220 redetermines the MCS level and the transmission power density for the first data packet and the second data packet by using the resource allocation parameters for the first data packet and the packet information of the second data packet. The operation part 220 calculates the number of total allocation slots for the first and second data packets (i.e. the second resource value) by using the MCS level and the transmission power density for the first and second data packets and the number of total allocation bytes that is a sum of the number of the first total allocation bytes for the first data packet and the number of the second total allocation bytes for the second data packet. For reference, the number of the first total allocation bytes is included in the resource allocation parameter for the first data packet. In this case, the operation part 220 determines the MCS level and the transmission power density corresponding to the types of the bursts to which the first data packet and the second data packet are allocated, by using the connection type information included in the packet information of the second data packet.

Then, the operation part 220 determines the final resource value for allocation by using the number of total allocation slots (i.e. the second resource value), and transmits the final resource value for allocation to the generation part 230. In this case, the operation part 220 transmits allocation resource information containing the final resource value for allocation (i.e. the number of total allocation slots for the MS) and the final determined MCS level and transmission power density, to the generation part 230.

In this case, the operation part 220 performs the calculation for the allocation so that the number of total allocation slots is not greater than the number of allowable entire slots. Specifically, the operation part 220 completes the calculation for the allocation in case that the second resource value (i.e. the number of total allocation slots for the first and second data packets) is greater than the number of allowable entire slots in UL frame. In case that the second resource value is not greater than the number of allowable entire slots in UL frame, the operation part 220 determines the first resource value or the second resource value as the number of total allocation slots of the MS by comparing to the predetermined reference number for allocation slots within the number of allowable entire slots, or performs the calculation for the allocation resource value for the next data packet. In this case, the operation part 220 can determine the second resource value as the number of total allocation slots of the MS if the second resource value is not greater than the number of allowable entire slots in UL frame and is greater than the predetermined reference number for allocation slots.

Meanwhile, the operation part 220 stores the resource allocation parameters containing the redetermined MCS level and transmission power density, the number of total allocation slots, the second total remained power that is recalculated based on the number of total allocation slots, and the total power consumption, to the resource table, so as to refer parameters in calculation of resource value for the next UL data packet (i.e. the third data packet).

For reference, if the resource value to be currently calculated is the first resource value for the same MS (i.e. if the data packet for current resource value calculation is the first data packet for the same MS), the operation part 220 checks the total remained power of the MS, the MCS level, and the transmission power density from the transmission power report of the same MS which is received through the receiver 140, and can uses the checked total remained power, MCS level, and transmission power density and the stored number of total allocation slots for the latest UL frame, as parameters corresponding to the parameters for the previous resource allocation.

For reference, a method for calculating a resource value for UL data packet and a method for determining a power control parameter in the operation part 220 will be described below with reference to FIGS. 3 and 4.

The generation part 230 checks the number of total allocation slots from the allocation resource information of the MS which is received from the operation part 220, and allocates UL burst for the MS by using the number of total allocation slots. The generation part 230 checks the final determined MCS level and transmission power density from the allocation resource information, and generates Power Control IE (Information Element) corresponding to the final determined MCS level and transmission power level. Also, the generation part 230 generates MAP information containing the UL burst allocation information and the Power Control IE and transmits the MAP information to the MS. Herein, the UL burst allocation information includes information about the size and the position of the UL burst to be allocated.

Hereinafter, with reference to FIGS. 3 and 4, a method and apparatus for scheduling control which determine the MCS level and the transmission power level for resource allocation in radio communication system according to an embodiment of the present invention will now be described.

Figure 3:
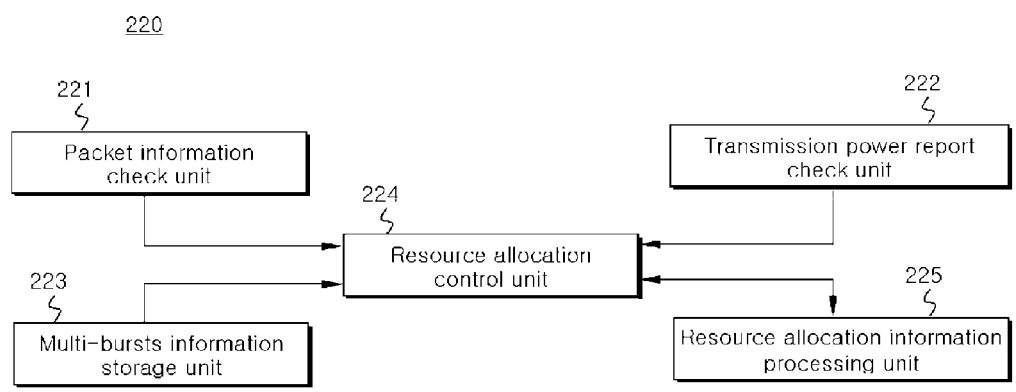
FIG. 3 is a diagram illustrating a structure of an operation part according to an embodiment of the present invention.

FIG. 3 is a diagram illustrating the structure of the operation part 220 of FIG. 2.

Referring to FIG. 3, the operation part 220 according to the present invention includes a packet information check unit 221, a transmission power report check unit 222, a multi-burst information storage unit 223, a resource allocation control unit 224, and a resource allocation information processing unit 225.

The packet information check unit 221 checks the connection type and the number of allocation bytes from the packet information of the current data packet which is received from the packet scheduler 210, and transmits them to the resource allocation control unit 224.

The transmission power report check unit 222 receives the transmission power report message of the MS through the receiver 140, checks the total remained power of the MS corresponding to the current data packet, and transmits it to the resource allocation control unit 224.

The multi-burst information storage unit 223 stores the number of bytes per slot and the transmission power density for each MCS level according to the burst types. For reference, the burst types are classified into normal burst and HARQ burst according to the connection type of the UL data packet, and the transmission power density and the number of bytes per slot which are required for the same MCS level are differently set according to the burst types.

The resource allocation control unit 224 calculates the allocation resource values for the data packets to be allocated to the same UL burst, by using the connection type and the number of allocation bytes for the current data packet which are received from the packet information check unit 221, the transmission power density for each MCS level according to the burst types which is received from the multi-burst information storage unit 223, and the resource allocation parameters which are obtained from the resource allocation information processing unit 225.

Specifically, the resource allocation control unit 224 redetermines the MCS level and the transmission power density for the first data packet and the second data packet, and calculates the resource value that is allocated for the first data packet and the second data packet, by using the redetermined MCS level and is power density. For reference, the resource allocation parameters include frame information, MS information, and burst information for at least one data packet that is prior to the current data packet.

Herein, the frame information includes the number of entire slots of the UL frame and the number of total allocation slots of the UL frame which is a sum of the resource value for each MS and the first resource value. The MS information includes the second total remained power and the total power consumption corresponding to the calculation result for the first resource value. The burst information includes the first resource value (i.e. the number of total allocation slots), the MCS level and transmission power density for the first data packet, and the number of total allocation bytes for the first data packet.

The resource allocation control unit 224 acquires the transmission power density for each MCS level according to the burst types from the multi-burst information storage unit 223, and redetermines the MCS level and transmission power density for the first and second data packet by using the transmission power density for each MCS level according to the burst types, the resource allocation parameters for the first data packet, and the packet information of the second data packet.

In this case, so as to redetermine the MCS level and the transmission power density for the first and second data packets, the resource allocation control unit 224 recalculates the total remained power that is a sum of the total power consumption and the second total remained power included in the resource allocation parameters for the first data packet, and calculates the maximum allowable bytes for each MCS level by using the first total remained power and the transmission power density for each MCS level according to the burst types.

Specifically, the resource allocation control unit 224 selects at least one MCS level within the first total remained power by referring to the transmission power density for each MCS level, and calculates the maximum allowable bytes according to the selected each MCS level. For reference, the maximum allowable bytes corresponding to each MCS level within the first total remained power can be calculated by the following Equations 1 and 2.

First, Equation 1 calculates the number of total available sub-channels.

$$\text{T\_sub} = \min\left[\text{M\_sub}, \text{floor}\left\{\frac{10\left(\frac{\text{R\_Total} - \text{Tx}_{MCS}}{10}\right)}{\text{Sc\_per\_Sub}}\right\}\right] \quad \text{[Equation 1]}$$

Referring to Equation 1, the number of total available sub-channels (T_sub) can be calculated by using the number of sub-channels of the UL frame (M_sub), the total remained power (R_Total), the transmission power density corresponding to the MCS level ($\text{Tx}_{MCS}$), and the number of sub-carriers per sub-channel (Sc_per_Sub).

Equation 2 calculates the maximum allowable bytes corresponding to the MCS level by using the number of total available sub-channels (T_sub) that is acquired by Equation 1.

$$\text{Max\_Byte}_{MCS} = \text{T\_sub} \times (DS1\_\text{per\_sub}) \times (\text{Byte\_per\_slot}_{MCS}) \quad \text{[Equation 2]}$$

Referring to Equation 2, the maximum allowable bytes corresponding to the MCS level ($\text{Max\_Byte}_{MCS}$) can be calculated by using the number of total available sub-channels (T_sub), the number of data slots per sub-channel (DS1_per_sub), and the number of bytes per slot corresponding to the MCS level ($\text{Byte\_per\_slot}_{MCS}$). In this case, the transmission power density and the number of bytes per slot corresponding to the MCS level are fixed values in accordance with burst type (i.e. normal burst or HARQ burst) in UL frame, which are stored in the multi-burst information storage unit 223. For reference, if the UL data packet for which the resource is currently allocated is the first UL data packet, the resource allocation control unit 224 can calculate the maximum allowable bytes for each MCS level by using the total remained power of the MS which has been received from the transmission power report check unit 222.

In this case, the resource allocation control unit 224 selects at least one MCS level that is available within the first total remained power, by comparing the number of total allocation bytes of the MS with the maximum allowable bytes for each MCS level, wherein the number of total allocation bytes is the sum of the number of total allocation bytes corresponding to the calculation result of the resource value for the first data packet (i.e. the number of the first total allocation bytes) and the number of bytes of the second data packet (i.e. the number of the second total allocation bytes).

Then, the resource allocation control unit 224 redetermines the most proper MCS level for the first data packet and the second data packet among the selected at least one MCS level, and the transmission power density corresponding to the most proper MCS level. For reference, the resource allocation control unit 224 redetermines the MCS level corresponding to the least slot allocation, among MCS levels that can use the maximum allowable bytes greater the total allocation bytes of the MS, as the most proper MCS level. That is, the resource allocation control unit 224 redetermines the MCS level in which the maximum allowable bytes is the smallest, among the selected MCS levels, and the corresponding transmission power density, as the MCS level and transmission power density for the first data packet and the second data packet.

Thereafter, the resource allocation control unit 224 calculates the second resource value for the first data packet and the second data packet, by using the redetermined MCS level and transmission power density and the number of total allocation bytes of the MS. In this case, the resource allocation unit 224 can calculate the number of total allocation bytes for the first data packet and the second data packet (i.e. the second resource value) by using the following Equation 3.

$$\text{Total\_slot} = \text{ceil}\left(\frac{\text{Alloc\_byte}}{\text{Byte\_per\_slot}_{MCS}}\right) \quad \text{[Equation 3]}$$

Referring to Equation 3, the number of total allocation slots of the MS (Total_slot) can be calculated by using the number of bytes per slot corresponding to the redetermined MCS level (Byte_per_slot$_{MCS}$) and the total allocation bytes for the MS (Alloc_byte). Also, as illustrated in the following Equations 4 and 5, the resource allocation control unit 224 can calculate the total power consumption corresponding to the calculation result of the current allocation resource value, by calculating the number of total allocation sub-channels and the number of total allocation sub-carriers for the first data packet and the second data packet based on the number of total allocation slots of the MS, $$\text{Total\_slot} = \min\left\{M\_sub, \text{ceil}\left(\frac{\text{Total\_slot}}{\text{DS1\_per\_sub}}\right)\right\} \quad \text{[Equation 4]}$$

Referring to Equation 4, the number of total allocation sub-channels (Total_sub) can be calculated by using the number of sub-channels of the UL frame (M_sub), the number of data slots per sub-channel (DS1_per_sub), and the number of total allocation slots (Total_slot).

$$Tot\_SC = Sc\_per\_Sub \times Total\_sub \quad \text{[Equation 5]}$$

Referring to Equation 5, the number of total allocation sub-carriers (Tot_SC) can be calculated by using the number of sub-carriers per sub-channel (Sc_per_Sub) and the number of total allocation sub-channels (Total_sub).

In this case, as illustrated in the following Equation 6, the resource allocation control unit 224 can calculate the total power consumption by using the number of total allocation sub-carriers.

$$\text{Total\_cons} = Tx_{MCS} + 10 \log 10(Tot\_SC) \quad \text{[Equation 6]}$$

Referring to Equation 6, the total power consumption with dB scale (Total_cons) can be calculated by using the transmission power density corresponding to the redetermined MCS level (Tx$_{MCS}$) and the number of total allocation sub-carriers (Tot_SC).

In this case, the resource allocation control unit 224 recalculates the second total remained power by subtracting the total power consumption from the first total remained power.

Meanwhile, the resource allocation control unit 224 determines whether to calculate the resource value for allocation for the MS or not, according to whether the second resource value is within the number of total allocable resources of the UL frame. For reference, the number of total allocable resources of the UL frame indicates the number of resources excepting the number of previously allocated slots to the UL frame (i.e. the value of the resources that have been already allocated to other MSs) from the number of entire slots of the UL frame.

Specifically, the resource allocation control unit 224 decides whether to calculate the resource value that will be allocated to the third data packet or not, by using the number of total allocation slots of the UL frame to which the second resource value is applied and the number of entire slots of the UL frame. For reference, the number of total allocation slots of the UL frame is the sum of the resource value that has been already allocated to the UL frame and the resource value that is calculated for the corresponding MS. In this case, if the second resource value is not greater than the number of total allocable resources of the UL frame (i.e. if the number of total allocation slots of the UL frame to which the second resource value is applied is not greater than the number of entire slots of the UL frame), the resource allocation control unit 224 compares the second resource value with the reference resource value that is within the number of total allocable resources of the UL frame.

Then, if the second resource value is greater than the reference resource value, the resource allocation control unit 224 completes the calculation of the resource value that is allocated for the data packet of the MS, and determines the second resource value as the final allocation resource value for the first data packet and the second data packet. On the other hand, if the second resource value is not greater than the reference resource value, the resource allocation control unit 224 performs the calculation of the resource value that will be allocated for the third data packet.

Meanwhile, if the second resource value is greater than the number of total allocable resources of the UL frame (i.e. if the number of total allocation slots of the UL frame to which the second resource value is applied is greater than the number of entire slots of the UL frame), the resource allocation control unit 224 completes the calculation of the resource value that is allocated for the data packet of the MS, and determines the first resource value as the final allocation resource value for the first data packet.

Thereafter, the resource allocation control unit 224 controls UL burst allocation for the corresponding MS, by transmitting the allocation resource information containing the final allocation resource value to the generation part 230.

Specifically, the resource allocation control unit 224 acquires the resource allocation parameters for the first data packet from the resource allocation information processing unit 225, at calculation of the resource value that is allocated for the data packet, and checks the number of entire slots of the UL frame and the first resource value included in the resource allocation parameters. Then, the resource allocation control unit 224 recalculates the number of total allocation slots of the current UL frame by subtracting the first resource value from the number of total allocation slots of the UL frame which is calculated till the first data packet. Then, the resource allocation control unit 224 recalculates the number of total allocation slots of the current UL frame by adding the number of total allocation slots which is calculated for the first data packet and the second data packet (i.e. the second resource value) to the number of recalculated total allocation slots of the UL frame, and decides whether the resource allocation for the third data packet is possible or not, by using the number of recalculated total allocation slots of the current UL frame.

In this case, if the resource allocation for the third data packet is possible, the resource allocation control unit 224 transmits the number of total allocation slots of the current MS, the second total remained power, the determined MCS level and transmission power density for the first and second data packets, the number of total allocation slots of the current UL frame, the total power consumption corresponding to the calculation result of the second resource value, and the number of total allocation bytes of the current MS to the resource allocation information processing unit 225, so as to store them as the resource allocation parameters which are used in calculation of the resource value for the third data packet.

The resource allocation information processing unit 225 provides the resource allocation parameters for the first data packet corresponding to the same MS, in accordance with the request from the resource allocation control unit 224, and stores the resource allocation parameters corresponding to the calculation result of the resource value for the first and second data packets, in memory (not shown). In this case, the resource allocation parameters for the first data packet corresponding to the same MS is updated with the resource allocation parameters for the second data packet corresponding to the same MS.

Figure 4:
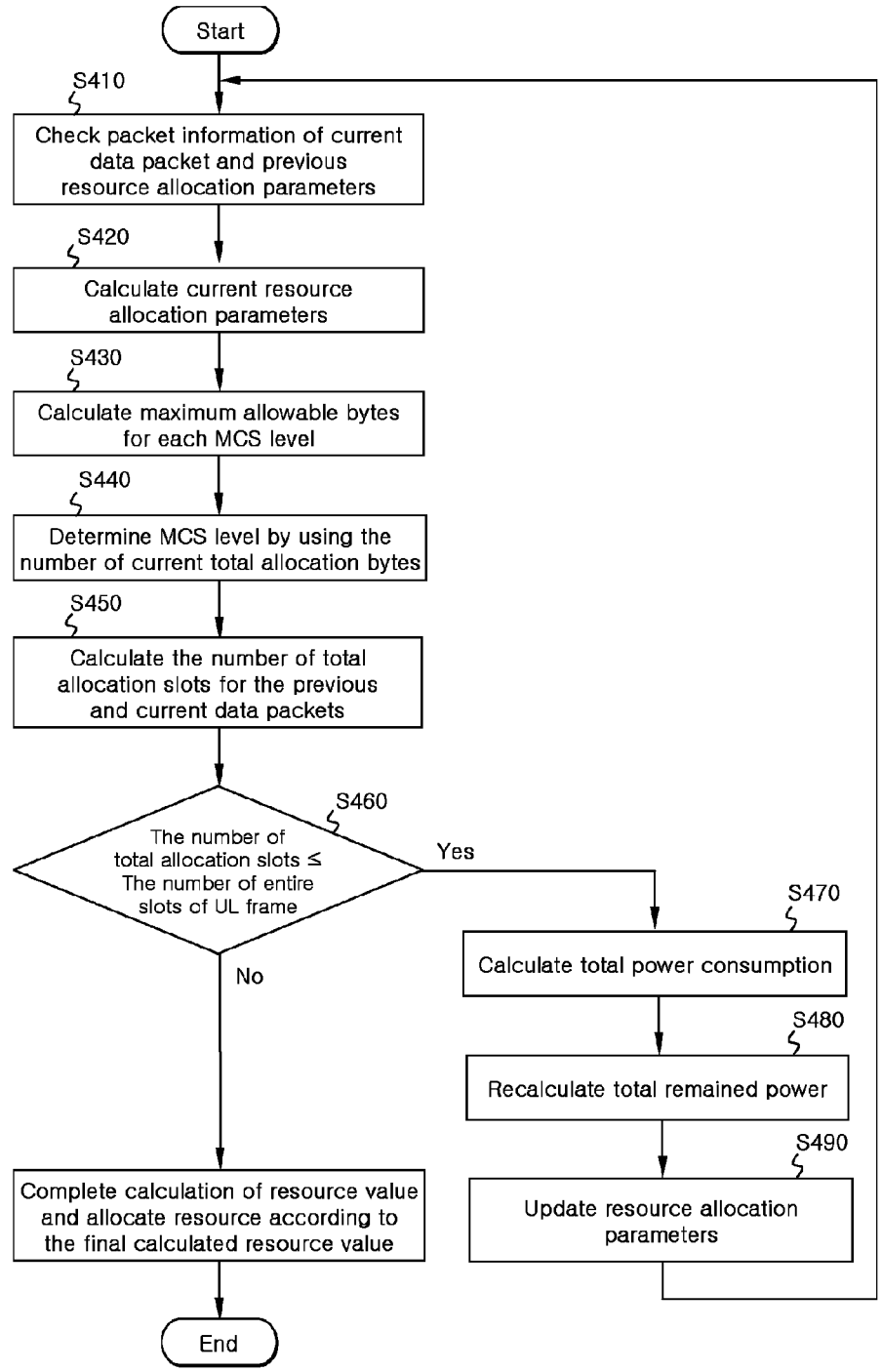
FIG. 4 is a flowchart illustrating a method for scheduling control according to an embodiment of the present invention.

FIG. 4 is a flowchart illustrating a method for scheduling control according to an embodiment of the present invention.

Referring to FIG. 4, in Step S410, the scheduler checks the packet information of the current UL data packet (e.g. the second data packet) for which the resource value for current allocation is calculated and the previous resource allocation parameters corresponding to the previous UL data packet (e.g. the first data packet).

In this case, the scheduler checks the number of total allocation slots of the UL frames and the number of entire slots of the UL frame from the frame information included in the previous resource allocation parameters, checks the total remained power and the total power consumption corresponding to the calculation result of the resource value for the first data packet from the MS information, and checks the number of total allocation bytes, the MCS level and transmission power density, and the number of total allocation slots, corresponding to the calculation result of the resource value for the first data packet, from the burst information.

In Step S420, the scheduler calculates the current resource allocation parameters for calculation of the current allocation resource value, by using the previous resource allocation parameters and the packet information of the second data packet.

In this case, the current resource allocation parameters include the total power consumption corresponding to the calculation result of the resource value for the first data packet, the current total remained power which is recalculated by using the total power consumption and the previous total remained power, the number of total allocation bytes of the MS which is calculated by using the number of total allocation bytes of the first data packet and the number of total allocation bytes of the second data packet, the number of total allocation slots of the UL frame, and the number of current total allocation slots which is recalculated by using the number of total allocation slots for the first data packet.

In Step S430, the scheduler calculates the maximum allowable bytes for each MCS level which are applied in calculation of the resource value for the first data packet and the second data packet. Specifically, the scheduler checks the total remained power from the resource allocation parameters, selects at least one MCS level which has available transmission power density within the total remained power, and calculates the maximum allowable bytes for at least one MCS level (i.e. the maximum allowable bytes for each MCS level) by using Equations 1 and 2.

In Step S440, the scheduler compares the maximum allowable bytes for at least one MCS level with the number of total allocation bytes of the MS, and determines a proper MCS level and transmission power density. In this case, the number of total allocation bytes of the MS denotes the number of current scheduled bytes which is the sum of the number of bytes for the previous data packet and the number of bytes for the current data packet.

In Step S450, the scheduler calculates the number of total allocation slots for the previous data packet and the current data packet (e.g. the first data packet and the second data packet), by using the determined MCS level and transmission power density. In this case, the number of total allocation slots can be calculated by using the number of bytes per slot corresponding to the determined MCS level and the number of total allocation bytes of the MS, as illustrated in Equation 3.

In Step S460, the scheduler determines whether the calculated number of total allocation slots of the UL frame is not greater than the number of entire slots of the UL frame. For reference, the resource allocation process is performed in case that the number of total allocation slots of the UL frame is not greater than the number of entire slots of the UL frame, wherein the number of total allocation slots of the UL frame is the sum of the number of total allocation slots for the corresponding MS and the number of total allocation slots for other MSs.

As a result of the determination in Step S460, if the number of total allocation slots is greater than the number of entire slots of the UL frame, the scheduler completes the calculation process for resource value for the data packet of the MS. In this case, according to an embodiment of the present invention, the scheduler allocates resource for the first data packet by using the first resource value.

On the other hand, as a result of the determination in Step S460, if the number of total allocation slots is not greater than the number of entire slots of the UL frame, in Step S470, the scheduler calculates the total power consumption by using the number of total allocation bytes and the MCS level determined in Step S440. In this case, the total power consumption can be calculated by using Equations 3 to 6.

In Step S480, the scheduler recalculates the total remained power by subtracting the total power consumption from the current total remained power.

In Step S490, the scheduler updates the previous resource allocation parameters generates with the current resource allocation parameters containing the number of total allocation slots and the redetermined MCS level and transmission power density. In this case, the current resource allocation parameters include the total remained power, the number of total allocation slots of the UL frame, the number of total allocation bytes, the redetermined MCS level and transmission power density.

Then, after Step S490, the scheduler performs the resource allocation process for the next UL data packet by repeatedly performing Steps S410-S490.

Meanwhile, in FIG. 4, as a result of the determination in Step S460, if the number of total allocation slots is not greater than the number of entire slots of the UL frame, the scheduler calculates the resource value for the next data packet.

However, in another embodiment of the present invention, as a result of the determination in Step S460, if the number of total allocation slots is not greater than the number of entire slots of the UL frame and is not greater than the reference number for allocation slots, the scheduler performs Step S470-S490, if the number of total allocation slots is not greater than the number of entire slots of the UL frame and is greater than the reference number for allocation slots, the scheduler can performs resource allocation for the corresponding MS by using the number of total allocation slots.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for controlling an uplink scheduling for a mobile station in a radio communication system, the method comprising:
    calculating a first resource value for a first data packet of the mobile station by using packet information of the first data packet;
    determining an MCS level and a transmission power density for the first data packet and a second data packet of the mobile station by using a resource allocation parameter for the first data packet and packet information of the second data packet, wherein the second data packet is allocated next to the first data packet according to a resource allocation order;
    calculating a second resource value for the first data packet and the second data packet by using the MCS level and the transmission power density, wherein the second resource value is the number of total allocation slots for the first and second data packet; and
    allocating the first resource value for the first data packet as the uplink resource if the second resource value is greater than the number of total allocable resources of the uplink frame, or
    allocating the second resource value for the first data packet and the second data packet as an uplink resource if the second resource value is not greater than the number of total allocable resources of an uplink frame.

2. The method of claim 1, wherein the step of allocating comprises: allocating the second resource value for the first data packet and the second data packet as the uplink resource if the second resource value is not greater than the number of total allocable resources of the uplink frame and is not smaller than a reference resource value.

3. The method of claim 1, wherein the step of allocating comprises: allocating the second resource value for the first data packet and the second data packet as the uplink resource if the second resource value is not greater than the number of total allocable resources of the uplink frame and is greater than a reference resource value.

4. The method of claim 1, wherein the step of allocating comprises:
    calculating a third resource value for the first data packet, the second data packet, and a third data packet if the second resource value is not greater than the number of total allocable resources of the uplink frame and is not greater than a reference resource value.

5. The method of claim 1, wherein the resource allocation parameter includes at least one of the number of allocation bytes, power consumption, remained power, the number of allocation slots, MCS level, and transmission power density.

6. The method of claim 1, after the step of allocating, further comprising:
    allocating an uplink burst by using information about the uplink resource; and
    generating MAP information containing information about the uplink burst allocation and information about the MCS level and the transmission power density.

7. The method of claim 1, wherein the step of determining comprises:
    determining a MCS level corresponding to the smallest number of maximum allowable bytes from among MCS levels in which the number of maximum allowable bytes is not smaller than the number of total allocation bytes for the first data packet and the second data packet, and the corresponding transmission power density thereto, as the MCS level and the transmission power density for the first data packet and the second data packet.

8. The method of claim 1, wherein the step of determining comprises:
    determining the MCS level and the transmission power density for the first data packet and the second data packet by using connection type of the first data packet and the second data packet.

9. The method of claim 1, wherein the step of calculating comprises: calculating a second resource value for the first data packet and the second data packet by using the MCS level, the transmission power density, and the number of total allocation bytes that is a sum of the first data packet and the second data packet.

10. An apparatus for controlling an uplink scheduling for a mobile station in a radio communication system, the apparatus comprising:
    a packet scheduler for performing a packet scheduling for at least one uplink data packet corresponding to a bandwidth request from a terminal in accordance with a resource allocation order;
    an operation part for calculating a second resource value for a first data packet and a second data packet of the mobile station by using a resource allocation parameter of the first data packet and packet information of the second data packet, and determining an uplink resource for the first data packet in accordance with the first resource if the second resource value is greater than the number of total allocable resources of the uplink frame, or for the first data packet and the second data packet in accordance with the second resource value if the second resource value is not greater than the number of total allocable resources of an uplink frame, wherein the second resource value is the number of total allocation slots for the first and second data packet; and
    a generation part for generating MAP information containing information about an uplink burst allocation and information about an MCS level and a transmission power density, based on the information about the uplink resource.

11. The apparatus of claim 10, wherein the operation part determines whether to allocate resources for the first data packet, the second data packet, and a third data packet, by using the second resource value and the number of total allocable resources of the uplink frame.

12. The apparatus of claim 10, wherein the operation part calculates a third resource value for the first data packet, the second data packet, and a third data packet if the second resource value is not greater than the number of total allocable resources of the uplink frame and is not greater than a reference resource value.

13. The apparatus of claim 10, wherein the resource allocation parameter includes at least one of the number of allocation bytes, power consumption, remained power, the number of allocation slots, MCS level, and transmission power density.

14. The apparatus of claim 10, wherein the operation part determines the MCS level and the transmission power density for the first data packet and the second data packet by using the number of maximum allowable bytes and the number of total allocation bytes for the first data packet and the second data packet.

15. The apparatus of claim 14, wherein the operation part calculates maximum allowable bytes for each MCS level by using a difference between the transmission power density for each MCS level and a remained power.

16. The apparatus of claim 10, wherein the operation part determines a MCS level corresponding to the smallest number of maximum allowable bytes from among MCS levels in which the number of maximum allowable bytes is not smaller than the number of total allocation bytes for the first data packet and the second data packet, and the corresponding transmission power density thereto, as the MCS level and the transmission power density for the first data packet and the second data packet.

17. The apparatus of claim 10, wherein the operation part determines the MCS level and the transmission power density for the first data packet and the second data packet by using connection type of the first data packet and the second data packet.

18. The apparatus of claim 10, wherein the operation part determines an MCS level and a transmission power density for a first data packet and a second data packet by using a resource allocation parameter for the first data packet and packet information of the second data packet, calculates a second resource value for the first data packet and the second data packet by using the MCS level, the transmission power density, and the number of total allocation bytes that is a sum of the first data packet and the second data packet.

19. A base station that allocates an uplink burst to a terminal in a radio communication system, wherein the base station includes
an interface;
a band signal processor;
a transmitter;
a receiver;
an antenna; and
a scheduler, wherein the scheduler includes a packet scheduler configured to perform a packet scheduling for at least one uplink data packet in accordance with a resource allocation order;
first resource value for a first data packet;
calculate a second resource value for the first data packet and a second data packet by using a resource allocation parameter for the first data packet and packet information about the second data packet; and
allocate the first resource value for the first data packet as an uplink resource if the second resource value is greater than the number of total allocable resources of an uplink frame, or allocate the second resource value for the first data packet and the second data packet as the uplink resource if the second resource value is not greater than the number of total allocable resources of the uplink frame, wherein the second resource value is the number of total allocation slots for the first and second data packet.

20. The apparatus of claim 19, wherein the scheduler further includes an operation part configured to:
determine an MCS level and a transmission power density for the first data packet and a second data packet by using a resource parameter for the first data packet and packet information of the second data packet,
wherein the second resource value for the first data packet and a second data packet is calculated by using the MCS level, the transmission power density, and the number of total allocation bytes that is a sum of the number of the first data packet and the second data packet.

* * * * *